United States Patent [19]

Land

[11] 4,198,152
[45] Apr. 15, 1980

[54] METHOD AND APPARATUS FOR ELIMINATING UNDESIRABLE BLEMISHES IN COATING OF PROCESSING FLUID

[75] Inventor: Edwin H. Land, Cambridge, Mass.

[73] Assignee: Polaroid Corporation, Cambridge, Mass.

[21] Appl. No.: 965,857

[22] Filed: Dec. 4, 1978

[51] Int. Cl.² .............................................. G03C 11/00
[52] U.S. Cl. ...................................... 354/317; 354/88; 352/130; 118/415
[58] Field of Search .................... 354/88, 317, 318; 352/78 R, 130; 118/410, 411, 412, 413, 415

[56] References Cited

U.S. PATENT DOCUMENTS

| | | | |
|---|---|---|---|
| 3,742,836 | 7/1973 | Cook et al. | 354/317 |
| 3,742,902 | 7/1973 | Heston | 118/415 |
| 3,871,013 | 3/1975 | Burke et al. | 354/317 |
| 3,951,530 | 4/1976 | Czumak et al. | 352/130 |
| 4,119,371 | 10/1978 | Stella | 352/130 |
| 4,119,990 | 10/1978 | Mason et al. | 352/78 R |

Primary Examiner—Michael L. Gellner
Assistant Examiner—Alan Mathews
Attorney, Agent, or Firm—Leslie J. Payne

[57] ABSTRACT

Method and apparatus for avoiding undesirable wakes or blemishes in a coating of processing fluid deposited on a moving run of an exposed film strip. Such apparatus includes a doctoring surface which traverses the film strip at an oblique angle to the direction of film strip advancement for continuously urging and guiding particles carried by the film strip towards at least one of the longitudinal margins thereof and, hence, away from the useful intermediate portion of the film strip.

9 Claims, 4 Drawing Figures

METHOD AND APPARATUS FOR ELIMINATING UNDESIRABLE BLEMISHES IN COATING OF PROCESSING FLUID

BACKGROUND OF THE INVENTION

1. Field of the Invention

The invention relates to photographic film processing, and more particularly, concerns an improved method and doctoring surface conformation for depositing a thin uniform layer of processing fluid on a moving run of a photographic film strip.

2. Description of the Prior Art

As a result of recent developments in the motion picture art, motion picture systems have been devised in which exposure, processing and projection operations are carried out on a photographic film strip contained at all times in a multipurpose cassette. Such a system has been disclosed in several U.S. patents, assigned in common with the present invention. In these cassettes a supply of light sensitive film can be exposed in a camera adapted to receive and operate the cassette. Processing or developing of the exposed film to provide the conventional series of positive transparent image frames is achieved by merely placing the cassette in a player or processing and viewing apparatus capable of activating a processor contained in the cassette. During the processing mode, the exposed film is rewound and a coating or layer of processing fluid from the processor is deposited along the length of the film. After processing in this manner, the player apparatus is operated as a projector to advance the film incrementally, frame-by-frame, past a light source. As a result, the scenes to which the film were exposed are capable of being reproduced on a screen.

While the advance in the motion picture art represented by such a system is apparent and needs no elaboration herein, it is critical to satisfactory performance of the system that the processing fluid must be deposited uniformly within extremely small dimensions over the emulsion layer on the film during processing. Failure to achieve such a uniform processing fluid layer on the emulsion layer can result in undesirable blemishes, sometimes observable as streaks during projection of the processed film. It follows, therefore, that the achievement of a uniform layer or coating of processing fluid on the film during the processing operation has been a major focal point of attention in overall system development.

The current state of the art with respect to achieving a uniform coating of processing fluid on such cassette contained film strips is represented by the disclosures of U.S. Pat. No. 3,871,013 issued Mar. 11, 1975 to Edward F. Burke and Douglas B. Holmes, and U.S. Pat. No. 3,951,530 issued Apr. 20, 1976 to Frank M. Czumak, Paul B. Mason and Joseph A. Stella, both of which patents are commonly assigned with the present invention. In the disclosures of these patents, an inclined doctoring surface is used to develop a positive hydrodynamic force in the deposited processing fluid traveling therepast to thereby hold the film in engagement with an underlying pressure pad. To provide a net balance of forces on opposite sides of the film, the pressure pad is operative to support the film beneath the doctoring surface.

Entry of foreign particles, such as dust, into the cassette interior may arise from a number of factors, and in particular arises by virtue of ventilation openings in the cassette. While the presence of such particles in themselves is not a serious problem to film strip exposure and projection, it is critical to proper film strip processing that foreign particles present on the film strip be prevented from accumulating in the region of the doctoring surface by which the processing fluid is spread uniformly onto the film strip. The achievement of a net balance of forces on opposite sides of the film strip as it passes the doctoring surface in accordance with the disclosure of the aforementioned issued U.S. patents has contributed substantially to the solution of this problem by permitting film strip carried particles to pass the doctoring surfaces without accumulation and without dragging or streaking the processing fluid in a manner to create blemishes which will appear in the viewed images of the processed film strip. There still remains, however, some potential for wedging and accumulation of foreign particles as a result of the narrow gap between the doctoring surface and the film strip.

Moreover, the problems of achieving a uniform layer or coating of processing fluid on the film strip during the processing operation are further compounded by the requirement that each cassette carry its own processor and that the cassette and its components including the processor must be capable of mass production manufacturing techniques and be within tolerance levels incident to such techniques for the system to be acceptable in a competitive commercial market. Accordingly, the structural organization of the means by which the processing fluid is distributed onto the film and the successful elimination of disturbances on coating uniformity caused by trapped particles is critical to the overall system in which the cassette is used.

SUMMARY OF THE INVENTION

In accordance with the present invention, the potential for problems regarding the uniform coating of processing fluid from a cassette contained processor on the emulsion portion of the film caused by dust, or other foreign particles being engaged or trapped by a doctoring surface on a processor nozzle structure are substantially eliminated. Elimination is brought about by the provision of a processing fluid applicator nozzle structure having a doctoring surface which guides particles engaged or trapped thereby laterally away from an intermediate emulsion portion of the film strip to at least one of the film strip's longitudinal margins.

As in prior applications, the doctoring surface extends from adjacent a downstream portion of a nozzle opening, when viewed in the given direction of film strip advancement during processing, toward the emulsion surface and terminates at a given distance above the latter such that the doctoring surface forms an initial coating of processing fluid of predetermined thickness on the film and also traps particles of at least predetermined size. In the illustrated embodiment, the doctoring surface traverses the intermediate emulsion portion of the film strip at an oblique angle to the direction of film advancement such that particles engaged or trapped by such surface are guided laterally thereby away from the intermediate emulsion portion towards at least one of the longitudinal margins of the film in response to movement of the film therepast. Accordingly, adverse effects on the uniformity of the processing fluid coating covering the exposed intermediate emulsion portion are substantially eliminated.

Among the objects of the invention are therefore: the provision of an improved apparatus for the application of processing fluid to the emulsion side of a photographic film strip; the provision of an improved processor for film strips contained in multipurpose film cassettes, the provision of an improved applicator nozzle structure having a doctoring surface for substantially eliminating the adverse effects of trapped foreign particles on the uniformity of the processing fluid coating covering at least an intermediate emulsion portion of the film strip; the provision of such a nozzle structure capable of manufacture at practical costs for a once used component in a mass produced film cassette, and the provision of a method of substantially eliminating the adverse effects of trapped foreign particles on the uniformity of the processing fluid coating covering at least an intermediate emulsion portion of the film strip.

Other objects and further scope of applicability of the present invention will become apparent from the detailed description to follow when taken in conjunction with the accompanying drawings in which like parts are designated by like reference numerals.

DETAILED DESCRIPTION OF THE PREFERRED EMBODIMENT

Figure 1:
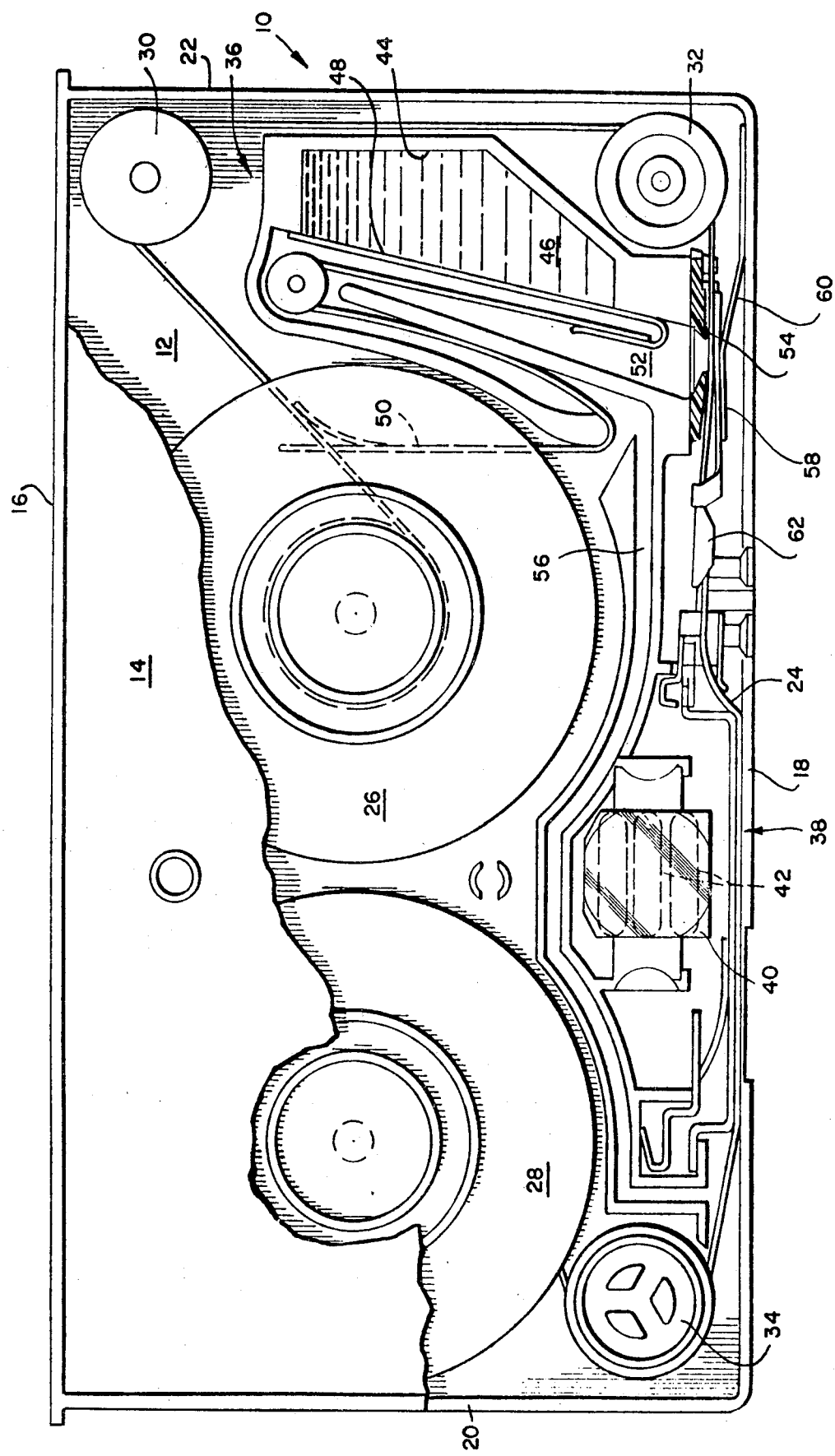
FIG. 1 is a side elevational view, partially broken away and partially in cross section, illustrating the interior arrangement of a photographic film cassette incorporating the improved applicator of the present invention.

In FIG. 1 of the drawings, a multipurpose film cassette incorporating the present invention is shown to include a housing generally designated by reference numeral 10. In this embodiment, the housing 10 takes the form of a rectangular parallelepiped having a pair of exterior side walls 12 and 14 which are connected by top, bottom and end walls 16, 18, 20 and 22, respectively. Within the housing 10, a film strip 24 is connected at its opposite ends to supply and take-up spools 26 and 28 for movement through a series of generally linear flights or runs defined by a bobulator roller 30, an idler guide roller 32 and a snubbing roller 34. When the film strip 24 runs between the guide roller 32 and the snubbing roller 34, in passing from the supply spool 26 to the take-up spool 28, it traverses a processor 36 and an exposure/projection aperture 38 in the bottom housing wall 18 under a reflecting prism 40, located adjacent ventilating openings 42 in the side wall 12.

Included in the processor 36 is a reservoir or pod 44 of processing fluid 46 initially sealed by a tear strip 48 which is connected to a film strip engaging pull strip 50. It is pointed out that the construction and operation of the pull strip 50 is fully disclosed in U.S. Pat. No. 3,895,862 issued July 22, 1975 to Joseph A. Stella et al. Therefore, the pull strip 50 need not be further described here except to note that upon initiation of a processing cycle, it becomes engaged by an aperture (not shown) in the end portion of the film strip 24 to pull the tear strip 48 away from the pod or reservoir 44. As a result, the processing fluid 46 is allowed to flow into a chamber 52 closed at its bottom by an applicator nozzle 54, hereinafter described in more detail. At the completion of tear strip removal, the pull strip 50 becomes wound between the convolutions of the film strip 24 on the supply spool 26, whereas the tear strip 48 becomes separated and remains in a storage chamber 56.

Also, in accordance with the disclosure of prior patents including those mentioned above, the run of the film strip 24 between the guide roller 32 and the snubbing roller 34 is situated between the bottom of the nozzle 54 and a pressure pad 48 biased upwardly by a spring 60, supported by the bottom wall 18 of the housing 10. Positoned upstream of the nozzle 54 (in the context of film strip travel during processing) is a valve member 62 which is engageable in the leading end portion of the film strip 24 so as to be advanced from the position shown to a position, not shown, underlying the nozzle 54 at the end of a processing cycle.

The general organization of cassette components illustrated in FIG. 1, as well as the operation of such components during exposure, processing and projection of the film strip 24, without removal thereof from the housing 10, is summarized herein principally for the purpose of providing an understanding of the environment in which the improved structure of the nozzle 54 is used. Although the housing 10 constitutes an essentially lighttight enclosure for the film strip 24, openings such as the ventilation openings 42 and the exposure/projection aperture 38, which are important to overall system operation, prevent exclusion of foreign particles such as dust to the housing interior.

While the effect of foreign particles on the film strip 24 or otherwise within the cassette interior, during use of the cassette to expose the film strip or to project the transparent image frames formed thereon after processing, is not significantly different than it is on conventional exposure or projection of motion picture film strips, it is important to completely satisfactory operation of the processor 36 that such foreign particles not interfere with the achievement of a uniform layer of the processing fluid 46 on the exposed emulsion layer E of the film strip.

Figure 2:
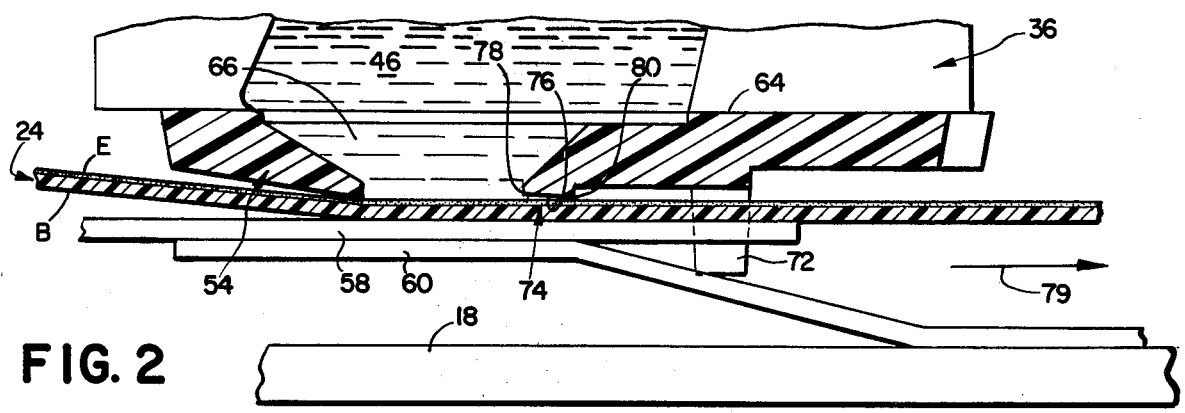
FIG. 2 is an enlarged, fragmentary view, partly in cross section, illustrating the operative components of the improved applicator nozzle shown in FIG. 1.
Figure 3:
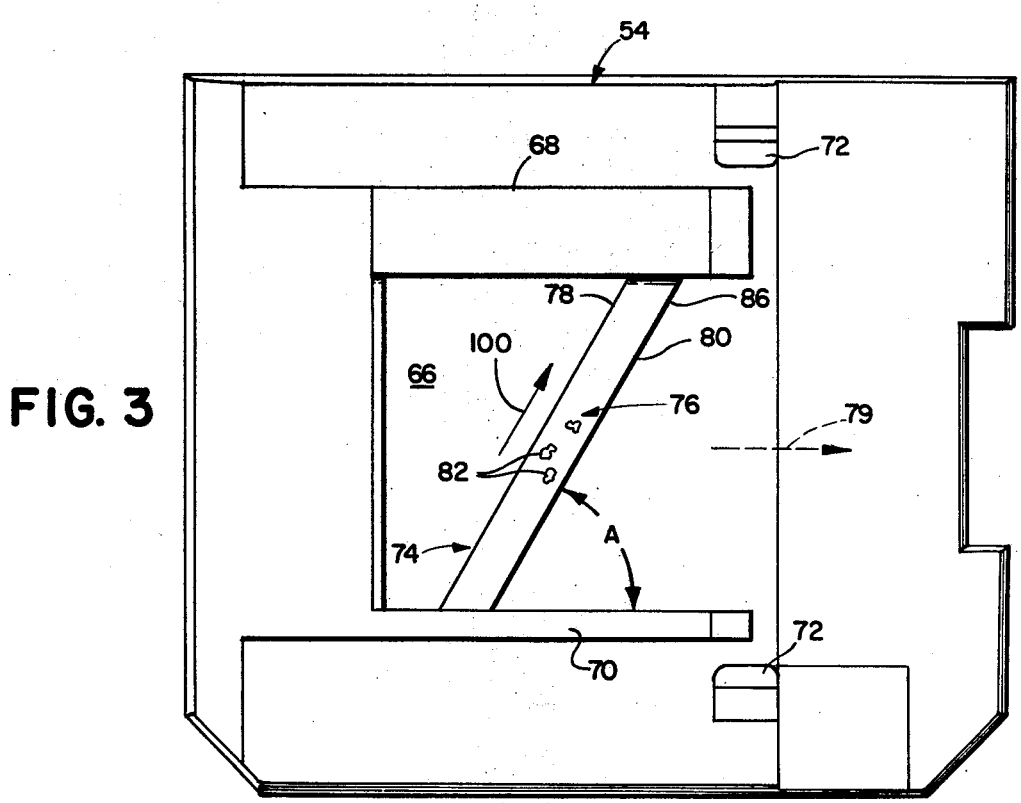
FIG. 3 is an enlarged, bottom plan view of the nozzle structure of FIG. 2.
Figure 4:
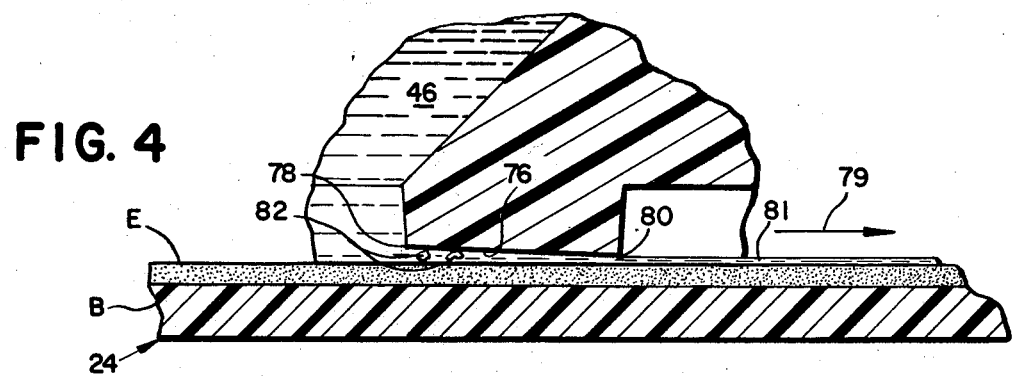
FIG. 4 is an enlarged, fragmentary view in cross section, illustrating in greater detail the improved doctoring surface of the nozzle shown in FIG. 1.

An understanding of the improved nozzle structure of the preferred embodiment and its use in operation may be gained by continued reference to the drawings and, in particular, FIGS. 2 to 4. In this embodiment, the nozzle 54 is an integral molding of suitable synthetic resinous material having an essentially planar top surface 64. Extending from top to bottom of the nozzle 54 is a generally rectangular nozzle opening 66 through which the processing fluid 46 is released onto the upper surface of an emulsion layer E carried by and extending across the width of a carrier base B of the film strip 24.

In FIG. 3, the surface configuration of the underside of the nozzle 54, presented to the film strip 24, is shown to include elongated planar guide tracks 68 and 70 located on the opposite side or lateral edges of the nozzle opening 66 and being in overlying relation to the longitudinal margins of the film strip 24 so as to make sliding contact with the emulsion layer E. As a result, the plane of the nozzle opening 66 is elevated above the upper surface af the emulsion layer E by a suitable distance. Since one longitudinal margin of the film strip 24 is larger than the other to accommodate feed apertures (not shown), the guide track 68 is wider than the guide track 70. Depending from the underside of the nozzle 54 is a pair of post-like abutments 72 which function to laterally guide the film strip 24 past the nozzle 54 and to also act as stops for the valve member 62.

With continued reference to FIGS. 2-4, the doctoring surface conformation 74 on the nozzle 54 is located downstream of the nozzle opening 66; as viewed in the context of film strip advancement during rewinding or processing, which in the drawings is from left to right as indicated by arrow 79. As best illustrated in FIGS. 3 and 4, the doctoring surface conformation 74 includes a generally planar, inclined doctoring surface 76 which extends between the guide tracks 68 and 70 from a leading edge 78, adjacent the downstream edge of the nozzle opening 66, to a trailing edge 80 of the doctoring surface which terminates above the upper surface of the emulsion layer E by a preselected distance. By way of example only, in practice of this invention, the leading edge 78 is spaced from the upper surface of the emulsion layer E by a distance of approximately .002 inch; while the trailing edge 80 is spaced from such upper surface by a distance of approximately 0.00065 inch.

This inclinaton of the doctoring surface 76 produces a desired positive hydrodynamic pressure gradient in the processing fluid 46 pasing therepast (which increases in the rewind or processing direction of film strip advancement), thereby enhancing deposition of a uniform layer or coating 81 of processing fluid on the film strip 24. However, such inclination also disadvantageously enhances the trapping of particles of at least a predetermined size, such as designated at 82 in FIG. 4.

Owing to this arrangement and particularly the inclination of the doctoring surface 76, the processing fluid 46 is spread substantially uniformly across the emulsion layer E at a preselected thickness between the longitudinal margins of the film strip 24. It will be appreciated that the hydrodynamic forces developed by the doctoring surface 76 will be a function of the latter's length and inclination, as well as the viscosity of the processing fluid 46, velocity of film strip travel relative to the doctoring surface 76 and the distance the trailing edge 80 is above the emulsion layer E.

The foregoing described construction of the doctoring surface 76 results in particles carried by the emulsion layer E engaging such doctoring surface, and as previously noted, the particles 82 engaged or trapped by the doctoring surface 76 can cause a wake in the fluid layer 81 which may be observable as objectionable streaks in the projected image. To correct this in accordance with the invention, the doctoring surface 76 is constructed and oriented to continuously urge and guide particles engaged or trapped by such surface lateral to the film in the direction shown by the arrow 100 in FIG. 3 and toward the longitudinal margin adjacent the guide track 68. Towards this particular end, the doctoring surface 76 is connected to and between the guide tracks 68, 70 such that it is oriented at an oblique angle A (FIG. 3) relative to the path of film strip travel in the rewind direction, as indicated by arrow 79. It will be appreciated that the oblique angle A is selected whereby the doctoring surface 76 will provide a reaction surface for the particles being forced thereagainst when traveling in the rewind direction 79, so that the doctoring surface reacts with the impact force of such particles to cause a sideways force component on the particles which will cause the particles to slide along the doctoring surface toward the film margin. Hence, the nozzle 54 and particularly the oblique angle of the doctor blade 76 provide means for depositing a uniform layer of processing fluid on the surface of the film strip and for urging particles of at least a predetermined size carried by the film strip to at least one of the longitudinal margins thereof.

In practice, the angle A may vary between about 20 degrees to 60 degrees. In the illustrated embodiment, an oblique angle of 30 degrees is used.

Other oblique angles for the doctoring surface 76 are usable so long as they insure that a sufficient sideways component of force is exerted on the particles 82 engaged by such surface so that these particles are urged along such surface to the longitudinal film strip's margin in response to the advancement of the film strip 24 in the rewind directon 79.

Although not illustrated, this invention envisages that the doctoring surface 76 can have more than one obliquely angled leading edge, for example, a V-shaped configuration with two segments diverging from an apex, situated over the intermediate portion of the emulsion layer E, and facing in the direction of advancement of the film strip 24 during the processing mode so that trapped particles will be displaced towards both longitudinal margins of the film strip.

Since the particles are urged to the film margin, any which are permanently trapped or engaged by the doctoring surface 76 will only cause elongated wakes or streaks in the deposited layer 81 along the longitudinal margin which is of course removed from or situated away from the intermediate portion of the emulsion surface E having viewable images. Accordingly, the uniformity of the processing fluid 46 covering the intermediate portion of the emulsion layer E having the viewable images is substantially undisturbed. Accordingly, the adverse effects of elongated wakes or streaks continuously disrupting the uniformity of the processing fluid coating over the noted intermediate portion of the emulsion layer E are substantially eliminated.

To provide a more complete understanding of the operation of the fluid applicator of the invention, the overall operation of the system will now be briefly explained. In operation of the cassette, the film strip 24, as supplied in its unexposed condition, will be essentially entirely contained on the supply spool 26 with a leader extending about the rollers 30, 32 and 34 to the take-up spool 28. The cassette is constructed to be placed within a camera (not shown) adapted to receive and operate the same. Operation of the camera will result in the film strip 24 being incrementally advanced past the pressure pad 54 and the aperture opening 38 to the take-up spool 28. After the film strip 24 has been completely exposed in the camera and removed therefrom, the cassette is inserted in a specially constructed player apparatus (not shown) which is operably in either a processing mode or projecting mode and equipped with means cooperable with the various operating components of the cassette to operate the latter.

Assuming the exposed film strip 24 has not been processed, the player operates to initially rewind the film so that the pull strip 50 becomes engaged by an aperture (not shown) in the trailing end portion of the film strip 24 to pull the tear strip 48 away from the pod or reservoir 44. As a result, the processing fluid 46 flows through the chamber 52 and the nozzle opening 66 so as to be deposited on the emulsion layer E.

Referring to FIG. 3, it will be observed that during this application of the processing fluid the particles 82 equal to or greater than a predetermined size carried by the film strip 24 as the latter travels in the rewind directon 79, will strike against the doctoring surface 76. Owing to the angular position of the doctoring surface 76 and the engaging force of the particles 82, the latter will be forced and guided therealong towards the guide track 68 and, hence, the film margin. Consequently, the wakes or streaks in the processing fluid 46 downstream of the trapped particles 82, while not being totally eliminated from the entire film, are eliminated from its useable intermediate portion or, that is, positioned to avoid adversely affecting the uniformity of the processing fluid coating over the intermediate portion of the emulsion layer E. In this manner, the viewing of processed recorded images on the emulsion layer E will not be detrimentally affected by blemishes caused by wakes or streaks in the processing fluid 46.

Thus, it will be appreciated that as a result of this invention an improved nozzle structure is provided for photographic film strip processors and by which the abovementioned objectives are completely fulfilled. Also, it will be apparent to those skilled in the art that modifications and/or changes may be made in the illustrated embodiment without departure from inventive concepts manifested thereby. Accordingly, it is expressly intended that the foregoing description is of a preferred embodiment only, not limiting, and that the true spirit and scope of the present invention be determined by reference to the appended claims.

What is claimed is:

1. In a cassette containing an elongated strip of film and a fluid applicator for depositing a layer of processing fluid on the film strip during advancement thereof in a given direction, said applicator includes means for depositing a uniform layer of the processing fluid on one film surface of the film strip and for urging particles of at least a predetermined size carried by the film strip to at least one of the longitudinal margins thereof, said depositing and urging means includes a nozzle opening through which the processing fluid is deposited onto said one surface, and an inclined generally planar doctoring surface extending from adjacent a trailing portion of the nozzle opening and converging toward said one film surface in said given direction and terminating at a generally uniform and preselected distance therefrom for depositing a substantially uniform layer of processing fluid thereon, said doctoring surface at least partially traversing an intermediate portion of the film strip at an oblique angle to the given direction for continuously urging particles engaged thereby towards at least one of the longitudinal margins of the film strip in response to advancement of the film therepast in said given direction.

2. The apparatus as set forth in claim 1 wherein said oblique angle is on the order of 20 degrees to 60 degrees.

3. The apparatus as set forth in claim 1 wherein said oblique angle is on the order of 30 degrees.

4. In a processing fluid applicator having means for depositing a layer of processing fluid on at least one surface of an elongated strip of photographic film intermediate the longitudinal margins thereof when the film is traveling in a given direction of film advancement, the improvement wherein said depositing means includes means for urging and guiding particles of at least a predetermined size carried by the film strip away from the intermediate portion of said one surface to at least one of the longitudinal margins of the film in response to movement of the film in said given direction, said depositing means includes a nozzle opening through which the processing fluid is deposited onto said one surface, and an inclined generally planar doctoring surface extending from adjacent a trailing portion of the nozzle opening and converging toward said one film surface in said given direction and terminating at a generally uniform and preselected distance therefrom for forming a generally uniform layer of processing fluid thereon, said doctoring surface at least partially traversing an intermediate portion of the film strip at an oblique angle to the given direction for continuously urging and guiding particles carried by the film and engaging therewith towards at least one of the longitudinal margins of the film strip in response to advancement of the film therepast in said given direction.

5. The apparatus as set forth in claim 4 wherein said oblique angle is on the order of 20 degrees to 60 degrees.

6. The apparatus as set forth in claim 4 wherein said oblique angle is on the order of 30 degrees.

7. The method of depositing a uniform layer of processing fluid on at least a surface portion of a photographic film strip, intermediate its longitudinal margins during advancement of the strip in a given direction, said method comprising the steps of:

depositing processing fluid on progressive incremental sections of at least said intermediate portion as said incremental sections are progressively advanced in said given direction; and continuously blading the deposited fluid over said intermediate portion at an oblique angle to said direction of advancement to define thereover a substantially uniform layer of processing fluid of predetermined thickness and to continuously urge and guide particles of at least a predetermined size carried by said intermediate portion towards at least one of the longitudinal margins of the film, wherein said blading step is performed by having an inclined and generally planar doctoring surface maintained so as to extend from a trailing edge of a nozzle opening and converge toward said film in the given direction and terminate at a generally preselected distance from said intermediate portion and at an oblique angle relative to the advancement of said film strip in said given directon.

8. The method of claim 7 wherein said oblique angle is in order of between about 20 to 60 degrees.

9. The method of claim 7 wherein said oblique angle is about 30 degrees.

* * * * *